(12) United States Patent
Yun et al.

(10) Patent No.: US 10,673,986 B2
(45) Date of Patent: Jun. 2, 2020

(54) OPERATION METHOD OF COMMUNICATION NODE FOR SELECTIVE WAKE-UP IN VEHICLE NETWORK

(71) Applicants: HYUNDAI MOTOR COMPANY, Seoul (KR); KIA MOTORS CORPORATION, Seoul (KR)

(72) Inventors: Jin Hwa Yun, Seoul (KR); Kang Woon Seo, Seoul (KR); Dong Ok Kim, Goyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 126 days.

(21) Appl. No.: 15/727,251

(22) Filed: Oct. 6, 2017

(65) Prior Publication Data
US 2018/0103121 A1   Apr. 12, 2018

(30) Foreign Application Priority Data

Oct. 7, 2016  (KR) .......................... 10-2016-0129972
Sep. 21, 2017  (KR) .......................... 10-2017-0121530

(51) Int. Cl.
*H04L 29/08* (2006.01)
*H04L 12/24* (2006.01)
*H04L 12/46* (2006.01)
*H04L 29/12* (2006.01)

(52) U.S. Cl.
CPC .......... *H04L 67/34* (2013.01); *H04L 12/4641* (2013.01); *H04L 41/082* (2013.01); *H04L 41/0803* (2013.01); *H04L 61/6022* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 7,620,057 B1* | 11/2009 | Aloni ................. | G06F 12/0804 370/395.7 |
| 2005/0083952 A1* | 4/2005 | Swain ................. | H04L 12/4625 370/401 |
| 2017/0058811 A1* | 3/2017 | Misson ................. | F02P 5/1502 |
| 2017/0178035 A1* | 6/2017 | Grimm ................. | H04L 63/061 |
| 2018/0097721 A1* | 4/2018 | Matsui ................. | H04L 45/28 |

* cited by examiner

*Primary Examiner* — Angela Nguyen
(74) *Attorney, Agent, or Firm* — Morgan, Lewis & Bockius LLP (57) ABSTRACT

An operation method of a first communication node among a plurality of communication nodes included in an Ethernet-based vehicle network may comprise receiving a first message requesting an update of software for a second communication node among the plurality of communication nodes; configuring a port for wake-up of the second communication node based on a path between the first communication node and the second communication node; transmitting a second message instructing wake-up of the second communication node via the configured port; and providing the update of the software to the second communication node based on the path corresponding to the configured port.

14 Claims, 8 Drawing Sheets

FIG. 9

OPERATION METHOD OF COMMUNICATION NODE FOR SELECTIVE WAKE-UP IN VEHICLE NETWORK

CROSS-REFERENCE TO RELATED APPLICATIONS

This application is based on and claims the benefit of priority to Korean Patent Applications No. 10-2016-0129972 filed on Oct. 7, 2016 and No. 10-2017-0121530 filed on Sep. 21, 2017 with the Korean Intellectual Property Office (KIPO), the entirety of which is incorporated by reference as if fully set forth herein.

TECHNICAL FIELD

The present disclosure relates to an operation method of a communication node for selective wake-up in a vehicle network, and more specifically, to an operation method of a communication node for selectively transmitting a wake-up message to a communication node among a plurality of communication node belonging to an Ethernet-based vehicle network.

BACKGROUND

Electronic devices installed in a vehicle have been increased significantly in their number and variety along with recent digitalization of vehicle parts. In general, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system require higher transmission rates and system expandability as most enhanced safety systems of a vehicle do. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based vehicle network may support bi-directional communication through one pair of windings and may support a transmission rate of up to 10 Gbps.

Specifically, the Ethernet-based vehicle network may include a plurality of communication nodes (e.g., electronic devices and switches, etc.) that perform Ethernet-based communications. When a first communication node acting as a switch among the plurality of communication nodes included in the vehicle network is transitioned to a wake-up state, the first communication node may transmit wake-up messages to all communication nodes connected to the first communication node. At this time, since all the communication nodes connected to the first communication node may receive the wakeup message from the first communication node, even communication nodes which are not required to be woken-up may be unnecessarily woken up, and the power may be wasted.

SUMMARY

The present disclosure provides an operation method of a communication node for selectively transmitting a wake-up message to a communication node among a plurality of communication nodes belonging to an Ethernet-based vehicle network.

In accordance with embodiments of the present disclosure, an operation method of a first communication node among a plurality of communication nodes included in an Ethernet-based vehicle network may include steps of receiving a first message requesting an update of software for a second communication node among the plurality of communication nodes; configuring a port for wake-up of the second communication node based on a path between the first communication node and the second communication node; transmitting a second message instructing wake-up of the second communication node via the configured port; and providing the update of the software to the second communication node based on the path corresponding to the configured port.

The first message may be received from an on-board diagnostic (OBD) apparatus capable of diagnosing the plurality of communication nodes included in the Ethernet-based vehicle network.

The port may be configured based on an address table including information on a plurality of communication nodes which are respectively connected through a plurality of ports included in the first communication node.

The address table may include port numbers of the plurality of ports included in the first communication node, medium access control (MAC) addresses of the plurality of communication nodes which are respectively connected through the plurality of ports, virtual local area network (VLAN) identifiers of the plurality of communication nodes which are respectively connected through the plurality of ports, and per-port wake-up indication values each of which indicates whether to wake up each of the plurality of communication nodes which are respectively connected through the plurality of ports.

The step of configuring may further include identifying the path between the first communication node and the second communication node based on a MAC address of the second communication node in the address table; identifying a first port corresponding to the MAC address of the second communication node among the plurality of ports included in the first communication node; and configuring the first port as the port for wake-up of the second communication node.

The step of configuring may further include setting a per-port wake-up indication value for the first port in order to indicate that the second communication node is a wake-up target.

The step of providing may further include obtaining software for updating the software for the second communication node from a memory of the first communication node; and transmitting a third message including the obtained software to the second communication node via the configured port.

The operation method may further include releasing the configured port from the port for wake-up of the second communication node when a fourth message indicating that the software for the second communication node has been updated is received via the configured port.

Further, in accordance with embodiments of the present disclosure, an operation method of a first communication node among a plurality of communication nodes included in an Ethernet-based vehicle network may include steps of receiving a first message requesting a diagnosis for a second communication node among the plurality of communication nodes; configuring a port for wake-up of the second communication node based on a path between the first communication node and the second communication node; transmitting a second message instructing wake-up of the second communication node via the configured port; and performing the diagnosis for the second communication node based on the path corresponding to the configured port.

The first message may be received from an on-board diagnostic (OBD) apparatus capable of diagnosing the plurality of communication nodes included in the Ethernet-based vehicle network.

The port may be configured based on an address table including information on a plurality of communication nodes which are respectively connected through a plurality of ports included in the first communication node.

The address table may include port numbers of the plurality of ports included in the first communication node, medium access control (MAC) addresses of the plurality of communication nodes which are respectively connected through the plurality of ports, virtual local area network (VLAN) identifiers of the plurality of communication nodes which are respectively connected through the plurality of ports, and per-port wake-up indication values each of which indicates whether to wake up each of the plurality of communication nodes which are respectively connected through the plurality of ports.

The step of configuring may further include identifying the path between the first communication node and the second communication node based on a MAC address of the second communication node in the address table; identifying a first port corresponding to the MAC address of the second communication node among the plurality of ports included in the first communication node; and configuring the first port as the port for wake-up of the second communication node.

The step of configuring may further include setting the per-port wake-up indication value for the first port in order to indicate that the second communication node is a wake-up target.

The step of performing may further include transmitting a third message instructing to perform a diagnostic operation indicated by the first message to the second communication node via the configured port; receiving a fourth message including information on a result of the diagnostic operation from the second communication node; and performing the diagnosis for the second communication node based on the result of the diagnostic operation.

The operation method may further include releasing the configured port from the port for wake-up of the second communication node when a fifth message indicating that the diagnosis for the second communication node has been performed is received via the configured port.

Further, in accordance with embodiments of the present disclosure, a first communication node among a plurality of communication nodes in an Ethernet-based vehicle network may include a processor and a memory storing at least one instruction executed by the processor. The at least one instruction may be configured to receive a first message requesting an update of software for a second communication node among the plurality of communication nodes from an on-board diagnostic (OBD) apparatus; configure a port for wake-up of the second communication node based on an address table including information on a plurality of communication nodes which are respectively connected through a plurality of ports included in the first communication node; transmit a second message instructing wake-up of the second communication node via the configured port; provide the update of the software for the second communication node based on a path corresponding to the configured port; and release the configured port from the port for wake-up of the second communication node when a fourth message indicating that the software for the second communication node has been updated is received via the configured port.

The address table may include port numbers of the plurality of ports included in the first communication node, medium access control (MAC) addresses of the plurality of communication nodes which are respectively connected through the plurality of ports, virtual local area network (VLAN) identifiers of the plurality of communication nodes which are respectively connected through the plurality of ports, and per-port wake-up indication values each of which indicates whether to wake up each of the plurality of communication nodes which are respectively connected through the plurality of ports.

The at least one instruction may be further configured to identify a path between the first communication node and the second communication node based on a MAC address of the second communication node in the address table; identify a first port corresponding to the MAC address of the second communication node among the plurality of ports included in the first communication node; and set a per-port wake-up indication value for the first port in order to indicate that the second communication node is a wake-up target.

The at least one instruction may be further configured to obtain software for updating the software for the second communication node from a memory of the first communication node; and transmit a third message including the obtained software to the second communication node via the configured port.

According to the embodiments of the present disclosure, when software is updated or a diagnosis is required for a plurality of communication nodes included in a vehicle network, it is made possible to selectively transmit a wake-up message to a communication node requiring such the updating or diagnosis of software. In addition, the operation method of a communication node according to the present disclosure has an effect of preventing the power of the communication node from being wasted by efficiently managing the states of the plurality of communication nodes included in the vehicle network.

BRIEF DESCRIPTION OF DRAWINGS

Embodiments of the present disclosure will become more apparent by describing in detail forms of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 1:
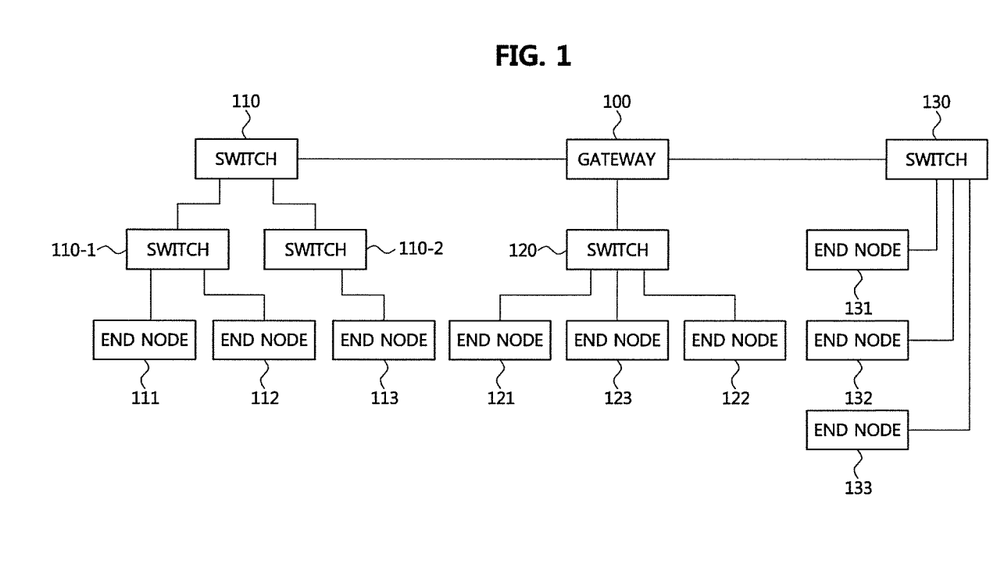
FIG. 1 is a block diagram illustrating a first embodiment of a vehicle network topology.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
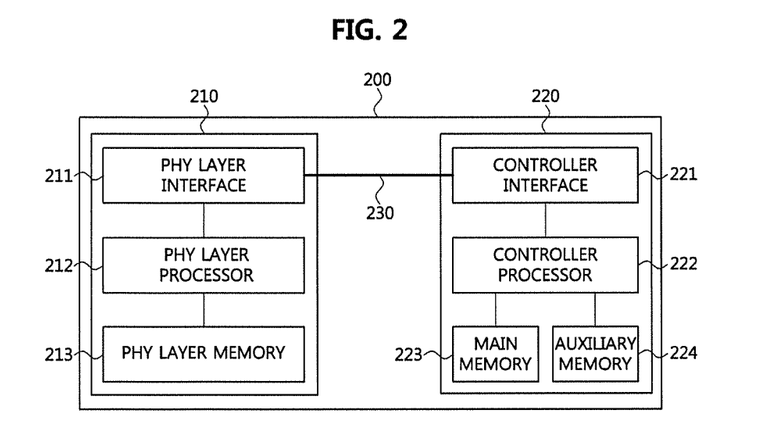
FIG. 2 is a block diagram illustrating a first embodiment of a communication node belonging to a vehicle network.

FIG. 2 is a block diagram illustrating a first embodiment of a communication node belonging to a vehicle network.

Referring to FIG. 2, a communication node 200 constituting a vehicle network may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The PHY layer processor 212 is an electric circuitry which performs various functions described below. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

In the following description, a method performed at a communication node belonging to a vehicle network and a corresponding counterpart communication node will be described. Hereinafter, even when a method (e.g., transmission or reception of a signal) to be performed at a first communication node is described, a counterpart second communication node corresponding to the first communication node may perform a method (e.g., reception or transmission of the signal) corresponding to the method performed at the first communication node. That is, when the operation of the first communication node is described, the corresponding second communication node can perform a counterpart operation corresponding to the operation of the first communication node. Conversely, when the operation of the second communication node is described, the corresponding first communication node can perform a counterpart operation corresponding to the operation of the second communication node.

Figure 3:
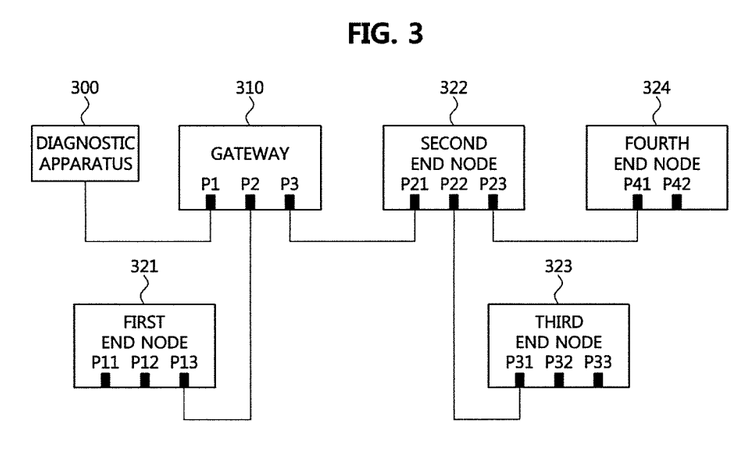
FIG. 3 is a conceptual diagram illustrating a vehicle network according to an embodiment of the present disclosure.

FIG. 3 is a conceptual diagram illustrating a vehicle network according to an embodiment of the present disclosure.

Referring to FIG. 3, a vehicle network according to an embodiment of the present disclosure may include a diagnostic apparatus (e.g., an on-board diagnostic (OBD) apparatus) 300, a gateway 310, a first end node 321, a second end node 322, a third end node 323, and a fourth end node 324. The gateway 310 included in the vehicle network may perform the same or similar functions as the gateway shown in FIG. 1 and the end nodes 321, 322, 323, and 324 may perform the same or similar functions as the end node shown in FIG. 1. Each of the gateway 310 and the end nodes 321, 322, 323, and 324 included in the vehicle network may be configured to be the same as or similar to the communication node shown in FIG. 2.

The gateway 310 may be connected to the diagnostic apparatus 300 via a port P1, may be connected to the first end node 321 via a port P2, and may be connected to the second end node 322 via a port P3. The first end node 321 may be connected to the gateway 310 via port a P13. The second end node 322 may be connected to the gateway 310 via a port P21, may be connected to the third end node 323 via a port P22, and may be connected to the fourth end node 324 via a port P23. The fourth end node 324 may be connected to the second end node 322 via a port P41.

In the vehicle network as described above, an operation method of a communication node for selective wake-up in accordance with an embodiment of the present disclosure may be performed. In particular, operation methods according to one embodiment of the present disclosure or other embodiments of the present disclosure may be described with reference to FIGS. 4 to 9 below.

Figure 4:
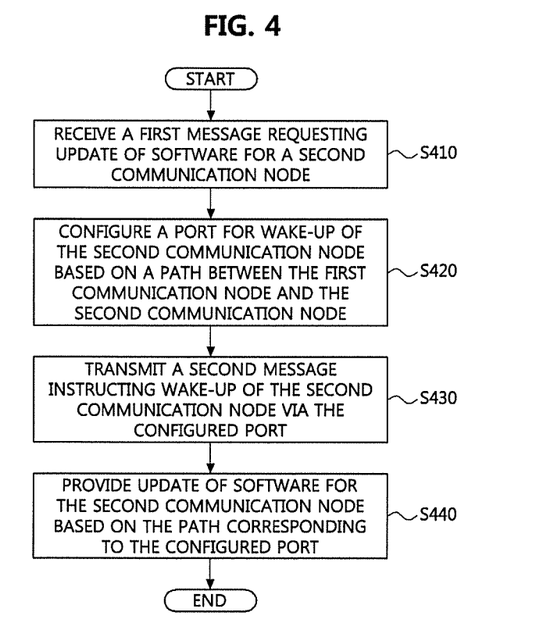
FIG. 4 is a flowchart for explaining an operation method of a communication node for selective wake-up in a vehicle network according to an embodiment of the present disclosure.

FIG. 4 is a flowchart for explaining an operation method of a communication node for selective wake-up in a vehicle network according to an embodiment of the present disclosure.

Referring to FIG. 4, an operation method according to an embodiment of the present disclosure may be performed by a first communication node of a plurality of communication nodes included in a vehicle network. The first communication node may perform the same or similar functions as the gateway shown in FIG. 1 and may be configured to be the same as or similar to the communication node shown in FIG. 2. A connection structure between the plurality of communication nodes and ports which are applied to the operation method to be described with reference to FIG. 4 may refer to the description related to the connection structure between the diagnostic apparatus, gateway, and end nodes which were described with reference to FIG. 3.

First, the first communication node may receive a first message requesting an update of software for a second communication node of the plurality of communication nodes (S410). Here, the first message requesting an update of the software for the second communication node may be received from an OBD apparatus capable of diagnosing the plurality of communication nodes included in the vehicle network. That is, the OBD apparatus may be connected to the first communication node through the port P1 of the plurality of ports included in the first communication node. For example, the first communication node may be the gateway 310 shown in FIG. 3, and the second communication node may be the third end node 323 shown in FIG. 3. Further, the OBD apparatus may be the diagnostic apparatus 300 connected to the gateway 310 shown in FIG. 3.

Then, the first communication node may configure a port for wake-up of the second communication node based on a path between the first communication node and the second communication node (S420). Specifically, the first communication node may configure the port based on an address table including information on a plurality of communication nodes connected through the plurality of ports included in the first communication node. For example, the address table may include port numbers of the plurality of ports included in the first communication node, medium access control (MAC) addresses and virtual local area network (VLAN) identifiers (IDs) of the plurality of communication nodes which are respectively connected through the plurality of ports, and per-port wake-up indication values each of which indicates whether to wake up each of the plurality of communication nodes which are respectively connected through the plurality of ports. Specifically, a method of configuring the port for wake-up at the first communication node may be described with reference to FIG. 5 below.

Figure 5:
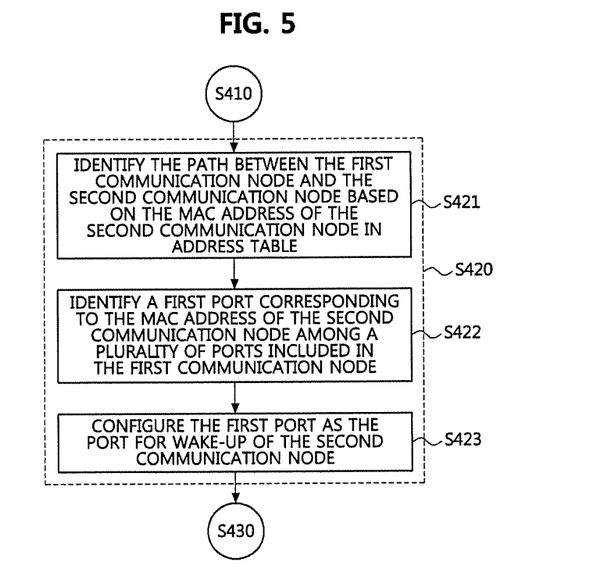
FIG. 5 is a flowchart for explaining a method of configuring a port for wake-up in a vehicle network according to an embodiment of the present disclosure.

FIG. 5 is a flowchart for explaining a method of configuring a port for wake-up in a vehicle network according to an embodiment of the present disclosure.

Referring to FIG. 5, the first communication node may identify the path between the first communication node and the second communication node based on the MAC address of the second communication node in the address table (S421). For example, the address table of the first communication node may be represented as shown in Table 1 below.

TABLE 1

| Port number | MAC address | VLAN ID | Per-port wake-up indication |
| --- | --- | --- | --- |
| P1 | 00-10-20-30-30-00 | . . . | 0 |
| P2 | 00-10-20-30-20-00 | . . . | 0 |
| P3 | 00-10-20-30-40-01 | . . . | 0 |
| P3 | 00-10-20-30-40-02 | . . . | 0 |
| P3 | 00-10-20-30-40-03 | . . . | 0 |

Table 1 may represent the address table of the first communication node. Specifically, Table 1 may include MAC addresses and VLAN IDs of the plurality of communication nodes connected through the plurality of ports P1, P2, and P3 included in the first communication node and per-port wake-up indication values each of which indicates whether or not to wake up each of the plurality of communication nodes connected to the corresponding ports. Here, it may be assumed that the MAC address of the first communication node is '00-10-20-30-40-00'. For example, the MAC address of the communication node connected through the port P1 of the first communication node may be '00-10-20-30-30-00', the MAC address of the communication node connected through the port P2 may be '00-10-20-30-20-00', and the MAC addresses of the communication nodes connected through the port P3 may be '00-10-20-30-40-01', '00-10-20-30-40-02', and '00-10-20-30-40-03'.

The first communication node may identify the port number corresponding to the MAC address of the second communication node in the address table as shown in Table 1. If the MAC address of the second communication node is '00-10-20-30-40-02', the first communication node may identify the port number corresponding to the MAC address '00-10-20-30-40-02' of the second communication node. Specifically, the first communication node may determine that the port number corresponding to the MAC address of the second communication node is P3. Accordingly, the first communication node may determine that the second communication node is connected to a third communication node connected through the port P3 among the plurality of ports included in the first communication node. That is, the first communication node may identify that the path between the first communication node and the second communication node is (first communication node→third communication node→second communication node).

For example, the third communication node may be the second end node shown in FIG. 3. That is, the third communication node may be the second end node connected through the port P3 among the plurality of ports included in the gateway of FIG. 3. Accordingly, the second communication node may be the third end node connected through the port P22 of the second end node of FIG. 3. Therefore, the path (first communication node 4 third communication node→second communication node) identified in the step S421 may mean a path (gateway→second end node→third end node) which can be identified in FIG. 3.

Then, the first communication node may identify a first port corresponding to the MAC address of the second communication node among the plurality of ports included in the first communication node (S422). That is, as described in the step S421, the first communication node may identify the port P3 corresponding to the MAC address '00-10-20-30-40-02' of the second communication node as the first.

Then, the first communication node may configure the identified first port as a port for wake-up of the second communication node (S423). Specifically, in order to indicate that the second communication node is a wake-up target, the first communication node may set a per-port wake-up indication for the first port to '1'. For example, the per-port wake-up indication values included in the address table of the first communication node may be set as shown in Table 2 below.

TABLE 2

| Port number | MAC address | VLAN ID | Per-port wake-up indication |
|---|---|---|---|
| P1 | 00-10-20-30-30-00 | . . . | 0 |
| P2 | 00-10-20-30-20-00 | . . . | 0 |
| P3 | 00-10-20-30-40-01 | . . . | 1 |
| P3 | 00-10-20-30-40-02 | . . . | 1 |
| P3 | 00-10-20-30-40-03 | . . . | 1 |

Table 2 may represent the address table after the port for wake-up of the second communication node is configured. Specifically, as shown in Table 2, it can be seen that a per-port wake-up indication value indicating whether or not the port P3 is subject to wake-up is set to '1'. That is, when the per-port wake-up indication value for the port P3 is '0', this may mean that the port P3 is not subject to wake-up of the second communication node having the MAC address '00-10-20-30-40-02'. On the other hand, when the per-port wake-up indication value for the port P3 is '1', this may mean that the port P3 is subject to wake-up of the second communication node having the MAC address '00-10-20-30-40-02'.

Here, the first communication node may generate a message including an indicator instructing to configure a port for wake-up of the second communication node. The first communication node may then transmit the message to the third communication node connected to the first communication node via the port P3. That is, the first communication node may transmit the message instructing to configure a port for wake-up of the second communication node to at least one communication node (e.g., the third communication node) included in the path between the first communication node and the second communication node.

Accordingly, the third communication node may receive the message instructing to configure a port for wake-up of the second communication node from the first communication node. Then, the third communication node may identify the indicator instructing to configure a port for wake-up of the second communication node included in the message, and may configure a port for wake-up of the second communication node. A specific method of configuring a port for wake-up of the second communication node at the third communication node may be the same as the method for configuring a port for wake-up of the second communication node at the first communication node.

Specifically, the third communication node may identify the port corresponding to the MAC address of the second communication node in the address table included in the third communication node, and may configure the identified port as the port for wake-up of the second communication node. That is, the third communication node may configure the port for wake-up of the second communication node by setting a per-port wake-up indication value indicating whether or not to wake up the port corresponding to the MAC address of the second communication node in the address table of the third communication node. For example, the address table of the third communication node may be represented as shown in Table 3 below.

TABLE 3

| Port number | MAC address | VLAN ID | Per-port wake-up indication |
|---|---|---|---|
| P21 | 00-10-20-30-40-00 | . . . | 0 |
| P22 | 00-10-20-30-40-02 | . . . | 0 |
| P23 | 00-10-20-30-40-03 | . . . | 0 |

Table 3 may represent the address table of the third communication node. The third communication node may have the address table as shown in Table 3, and identify the port number corresponding to the MAC address of the second communication node in the address table. That is, the second communication node may identify the port P22 corresponding to the MAC address '00-10-02-30-40-02' of the second communication node in the address table, and configure the identified port P22 as a port for wake-up of the second communication node. Accordingly, the address table of the third communication node where the port for wake-up of the second communication node has been configured may be expressed as shown in Table 4 below.

TABLE 4

| Port number | MAC address       | VLAN ID | Per-port wake-up indication |
|-------------|-------------------|---------|-----------------------------|
| P21         | 00-10-20-30-40-00 | . . .   | 0                           |
| P22         | 00-10-20-30-40-02 | . . .   | 1                           |
| P23         | 00-10-20-30-40-03 | . . .   | 0                           |

Table 4 may represent the address table of the third communication node where the port for wake-up of the second communication node has been configured. That is, the third communication node may set a per-port wake-up indication value for the port P22 to '1'. The port for wake-up of the second communication node in the vehicle network according to an embodiment of the present disclosure may be configured through the method as described above.

Referring again to FIG. 4, the first communication node may transmit a second message instructing wake-up of the second communication node through the configured port (S430). Specifically, the first communication node may generate the second message including an indicator instructing wake-up of the second communication node. Here, the second message may further include the MAC address for the second communication node. Then, the first communication node may transmit the second message through the port P3, which is the port configured in the step S423.

Accordingly, the third communication node connected through the port P3 of the first communication node may receive the second message from the first communication node. At this time, the third communication node may receive the second message through the port P21. Thereafter, the third communication node may identify the indicator instructing wake-up of the second communication node in the message, and may also generate a message including an indicator instructing wake-up of the second communication node. Thereafter, the third communication node may transmit the generated message including the indicator instructing wake-up of the second communication node via the port P22.

Accordingly, the second communication node may receive the message from the third communication node. At this time, since the second communication node is connected to the third communication node via the port 31, the second communication node may receive the message instructing the wake-up. Thereafter, the second communication node may identify the indicator instructing the wake-up, and may transition its state to a wake-up state.

The first communication node may then provide an update of software for the second communication node based on the path corresponding to the port configured for wake-up of the second communication node (S440). Specifically, a method of providing software updates to the second communication node at the first communication node may be described with reference to FIG. 6 below.

Figure 6:
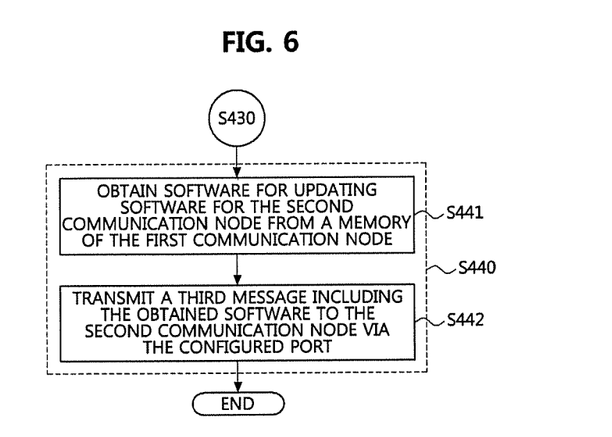
FIG. 6 is a flow chart for explaining a method for providing software updates in a vehicle network according to an embodiment of the present disclosure.

FIG. 6 is a flow chart for explaining a method for providing software updates in a vehicle network according to an embodiment of the present disclosure.

Referring to FIG. 6, the first communication node may obtain software for updating the software for the second communication node from a memory of the first communication node (S441). For example, the first communication node may identify an identifier of the software requested to be updated in the first message received from the OBD apparatus, and retrieve software corresponding to the identified identifier from the memory of the first communication node. The first communication node may then obtain the software for updating the software for the second communication node from the memory of the first communication node.

Here, obtaining the software for updating the software for the second communication node from the memory of the first communication node may mean that the software for updating the software of the second communication node is pre-stored in the memory of the first communication node. On the other hand, if the software for updating the software of the second communication node is not pre-stored in the memory of the first communication node, the first communication node may request the software for updating the software of the second communication node to the diagnostic apparatus (e.g., the OBD apparatus).

Then, the first communication node may transmit a third message including the obtained software to the second communication node through the configured port (S442). Specifically, the first communication node may generate the third message including the software for updating the software for the second communication node. Thereafter, the first communication node may transmit the third message through the port configured for wake-up of the second communication node.

That is, the first communication node may transmit the third message to the third communication node via the port P3. Thus, the third communication node may receive the third message from the first communication node via the port P21. Thereafter, the third communication node may transmit the third message to the second communication node via the port P22. Thus, the second communication node may receive the third message from the third communication node via the port P31. Through such the method, the first communication node may provide the update of the software for the second communication node based on the path corresponding to the port configured for wake-up of the second communication node.

Meanwhile, the second communication node may obtain the software for updating the software of the second communication node in the third message received from the third communication node. The second communication node may then update the software of the second communication node based on the obtained software. The second communication node may then generate a fourth message indicating that the software of the second communication node has been updated. The second communication node may then transmit the fourth message to the third communication node via the port 31. Accordingly, the third communication node may receive the fourth message from the second communication node via the port P22. The third communication node may then transmit the fourth message to the first communication node via the port P21.

Accordingly, the first communication node may receive the fourth message from the third communication node via the port P3. As such, when the first communication node receives the fourth message indicating that the software of the second communication node has been updated via the port configured for wake-up of the second communication node, the first communication node may release the port configured for wake-up of the second communication node. Specifically, the first communication node may set the per-port wake-up indication value indicating whether to wake up the port corresponding to the MAC address of the second communication node in the address table of the first communication node, as shown in Table 5 below.

TABLE 5

| Port number | MAC address | VLAN ID | Per-port wake-up indication |
|---|---|---|---|
| P1 | 00-10-20-30-30-00 | . . . | 0 |
| P2 | 00-10-20-30-20-00 | . . . | 0 |
| P3 | 00-10-20-30-40-01 | . . . | 0 |
| P3 | 00-10-20-30-40-02 | . . . | 0 |
| P3 | 00-10-20-30-40-03 | . . . | 0 |

That is, the first communication node may set the per-port wake-up indication value indicating whether to wake up the port P3 corresponding to the MAC address of the second communication from '1' to '0'. At this time, the first communication node may generate a message instructing to release the port configured for wake-up of the second communication node, and may transmit the generated message to the third communication node. Accordingly, the third communication node may release the port configured for wake-up of the second communication node from the first communication node. A specific method of releasing the port configured for wake-up of the second communication node at the third communication node may be the same as the method of releasing the port configured for wake-up of the second communication node at the first communication node.

Meanwhile, in the vehicle network according to an embodiment of the present disclosure, when a time for performing the update of the software for the second communication node is preset, the first communication node may perform the update of the software for the second communication node at the preset time. That is, in the vehicle network according to an embodiment of the present disclosure, the first communication node may reserve the time when the update of the software for the second communication node is performed.

For example, in the vehicle network, the first communication node may check whether or not the time for performing the update of the software for the second communication node has been preset. Then, the first communication node may operate a timer included in the first communication node if the time for performing the update of the software for the second communication node is determined as having been preset. Then, the first communication node may monitor, via the operated timer, whether the preset time has elapsed to perform the update of the software for the second communication node.

Thereafter, the first communication node may obtain the software previously stored in the memory of the first communication node to update the software for the second communication node, if the preset time has elapsed to perform the update of the software for the second communication node. The first communication node may then provide the obtained software to the second communication node. Specifically, a method of providing the obtained software to the second communication node may be the same as described with reference to FIGS. 3 to 6.

Figure 7:
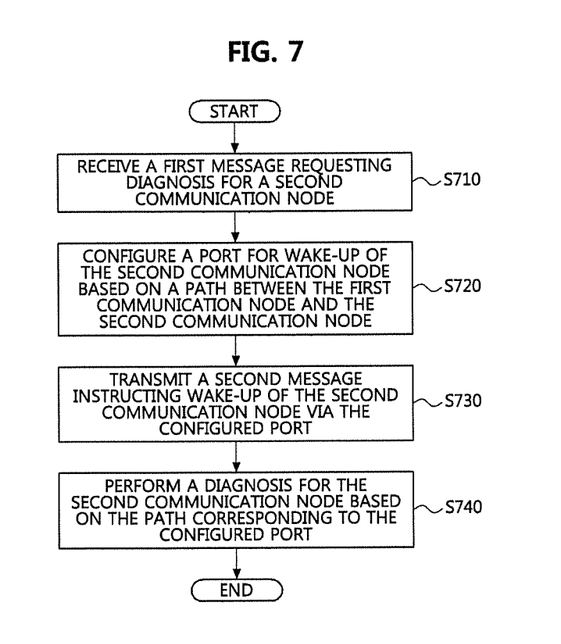
FIG. 7 is a flowchart for explaining an operation method of a communication node for selective wake-up in a vehicle network according to another embodiment of the present disclosure.

FIG. 7 is a flowchart for explaining an operation method of a communication node for selective wake-up in a vehicle network according to another embodiment of the present disclosure.

Referring to FIG. 7, an operation method according to another embodiment of the present disclosure may be performed by a first communication node of a plurality of communication nodes included in a vehicle network. The first communication node may perform the same or similar functions as the gateway shown in FIG. 1 and may be configured to be the same as or similar to the communication node shown in FIG. 2. A connection structure between the plurality of communication nodes and ports which are applied to the operation method to be described with reference to FIG. 7 may refer to the description related to the connection structure between the diagnostic apparatus, gateway, and end nodes which were described with reference to FIG. 3.

First, the first communication node may receive a first message requesting a diagnosis for a second communication node of the plurality of communication nodes (S710). Here, the first message requesting a diagnosis for the second communication node may be received from an OBD apparatus capable of diagnosing the plurality of communication nodes included in the vehicle network. That is, the OBD apparatus may be connected to the first communication node through the port P1 of the plurality of ports included in the first communication node. For example, the first communication node may be the gateway 310 shown in FIG. 3, and the second communication node may be the third end node 323 shown in FIG. 3. Further, the OBD apparatus may be the diagnostic apparatus 300 connected to the gateway shown in FIG. 3.

Then, the first communication node may configure a port for wake-up of the second communication node based on a path between the first communication node and the second communication node (S720). Specifically, the first communication node may configure the port based on an address table including information on a plurality of communication nodes connected through the plurality of ports included in the first communication node. For example, the address table may include port numbers of the plurality of ports included in the first communication node, MAC addresses and VLAN IDs of the plurality of communication nodes which are respectively connected through the plurality of ports, and per-port wake-up indication values each of which indicates whether to wake up each of the plurality of communication nodes which are respectively connected through the plurality of ports. Specifically, a method of configuring the port for wake-up at the first communication node may be described with reference to FIG. 8 below.

Figure 8:
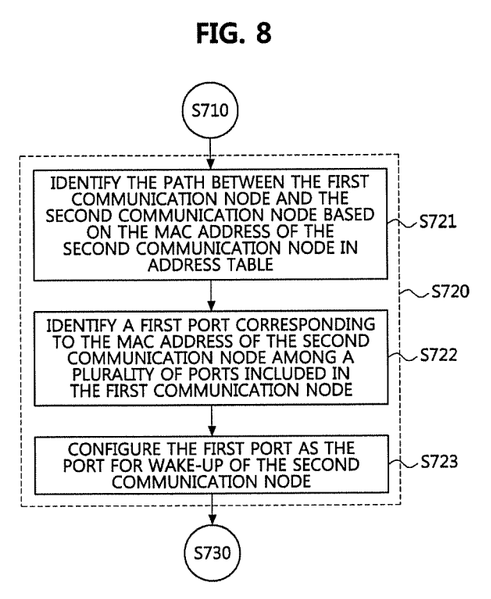
FIG. 8 is a flowchart for explaining a method of configuring a port for wake-up in a vehicle network according to another embodiment of the present disclosure.

FIG. 8 is a flowchart for explaining a method of configuring a port for wake-up in a vehicle network according to another embodiment of the present disclosure.

Referring to FIG. 8, the first communication node may identify the path between the first communication node and the second communication node based on the MAC address of the second communication node in the address table (S721). A specific method of identifying the path between the first communication node and the second communication node at the first communication node may be the same as the method of identifying the path between the first communication node and the second communication node described in the step S421 of FIG. 4.

Then, the first communication node may identify a first port corresponding to the MAC address of the second communication node among the plurality of ports included in the first communication node (S722). That is, as described in the step S421 of FIG. 4, the first communication node may identify the port P3 corresponding to the MAC address '00-10-20-30-40-02' of the second communication node as the first port.

Then, the first communication node may configure the identified first port as a port for wake-up of the second communication node (7423). Specifically, in order to indicate that the second communication node is a wake-up target, the first communication node may set a port-port wake-up indication value for the first port to '1'. A specific method of configuring the port for wake-up of the second communication node at the first communication node may be the same as the method for configuring the port for wake-up of the second communication node described in step S423 in FIG. 4.

Referring again to FIG. 7, the first communication node may transmit a second message instructing wake-up of the second communication node through the configured port (S730). Specifically, the first communication node may generate the second message including an indicator instructing wake-up of the second communication node. Here, the second message may further include the MAC address for the second communication node. Then, the first communication node may transmit the second message through the port P3, which is the port configured in the step S723. A specific method of transmitting the second message instructing wake-up of the second communication node at the first communication node may be the same as the method of transmitting the second message instructing wake-up of the second communication node described in the step S430 of FIG. 4.

Thereafter, the first communication node may perform a diagnosis for the second communication node based on the path corresponding to the port configure for wake-up of the second communication node (S740). Specifically, a method of performing a diagnosis for the second communication node at the first communication node may be described with reference to FIG. 6 below.

Figure 9:
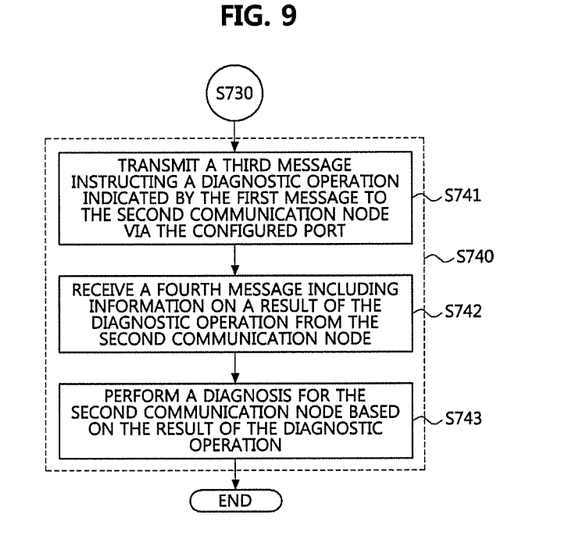
FIG. 9 is a flow chart for explaining a method for performing a diagnosis in a vehicle network according to another embodiment of the present disclosure.

FIG. 9 is a flow chart for explaining a method for performing a diagnosis in a vehicle network according to another embodiment of the present disclosure.

Referring to FIG. 9, the first communication node may transmit a third message instructing to perform a diagnostic operation indicated by the first message to the second communication node through the configured port (S741). Specifically, the first communication node may identify the diagnostic operation indicated by the first message received from the OBD apparatus. Then, the first communication node may generate the third message including an indicator instructing to perform the identified diagnostic operation. The first communication node may then transmit the third message to the third communication node via the port P3 of the first communication node connected to the third communication node.

Accordingly, the third communication node may receive the third message from the first communication node through the port P21 connected to the first communication node. The third communication node may then transmit the third message to the second communication node via the port P22 connected to the second communication node.

Accordingly, the second communication node may receive the third message through the port P31 connected to the third communication node. Thereafter, the second communication node may identify the indicator instructing the diagnostic operation in the third message, and may perform the diagnostic operation corresponding to the identified indicator. Thereafter, the second communication node may generate a fourth message including information on a result of performing the diagnostic operation, and may transmit the generated fourth message to the third communication node through the port P31. Accordingly, the third communication node may receive the fourth message including information on the result of performing the diagnostic operation from the second communication node through the port P22. Thereafter, the third communication node may transmit the fourth message to the first communication node via the port P21.

Accordingly, the first communication node may receive the fourth message including the information on the result of performing the diagnostic operation from the second communication node (S742). That is, the first communication node may receive the fourth message from the third communication node through the port P21 connected to the third communication node. For example, the information on the result of the diagnostic operation may include information on whether the diagnostic operation has been performed and whether a response message to the message instructing the diagnostic operation has been received.

Thereafter, the first communication node may perform the diagnosis for the second communication node based on the result of performing the diagnostic operation (S743). The diagnosis for the second communication node performed at the first communication node may indicate whether a failure occurs at the second communication node. For example, if the information on the result of the diagnostic operation included in the fourth message includes information indicating that the diagnostic operation has not been performed, or that the response message to the message instructing the diagnostic operation has not been received, the first communication node may determine that the second communication node is in a failed state. On the other hand, if information on the result of the diagnostic operation included in the fourth message includes information indicating that the diagnostic operation has been normally performed, or includes information indicating that a response message to the message instructing the diagnostic operation has been received, the first communication node may determine that the second communication node is in a normal state. In this way, the first communication node in the vehicle network may perform a diagnostic operation for the second communication node.

On the other hand, if the second communication node has normally performed the diagnostic operation, the second communication node may generate a fifth message indicating that the diagnosis is completed. The second communication node may then transmit the fifth message to the third communication node via the port P31 connected to the third communication node. Accordingly, the third communication node may receive the fifth message from the second communication node through the port P22 connected to the second communication node. The third communication node may then transmit the fifth message to the first communication node via the port P21 connected to the first communication node.

Accordingly, the first communication node may receive the fifth message indicating that the diagnosis is completed from the third communication node through the port P3 connected to the third communication node. In this manner, when the first communication node receives the fifth message indicating that the diagnosis for the second communication node is completed through the port configured for wake-up of the second communication node, the first communication node may release the configured port from the port configured for wake-up of the second communication node. Specifically, a method of releasing the configured port at the first communication node may be the same as the method of releasing the configured port described with reference to FIG. 4.

As described above, according to the embodiments of the present disclosure, a communication node can selectively wake up a communication node connected to a port required to be woken up among a plurality of ports included in the communication node.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node among a plurality of communication nodes included in an Ethernet-based vehicle network, comprising steps of:
    receiving a first message requesting an update of software for a second communication node among the plurality of communication nodes;
    configuring a port for wake-up of the second communication node based on a path between the first communication node and the second communication node;
    transmitting a second message instructing wake-up of the second communication node via the configured port; and
    providing the update of the software to the second communication node based on the path corresponding to the configured port,
    wherein the port is configured based on an address table including:
    port numbers of a plurality of ports included in the first communication node;
    medium access control (MAC) addresses of a plurality of communication nodes connected directly or indirectly to each of the plurality of ports;
    virtual local area network (VLAN) identifiers of the plurality of communication nodes connected to each of the plurality of ports; and
    per-port wake-up indication values each of which indicates whether to wake up each of the plurality of communication nodes which are respectively connected through the plurality of ports.

2. The operation method according to claim 1, wherein the first message is received from an on-board diagnostic (OBD) apparatus capable of diagnosing the plurality of communication nodes included in the Ethernet-based vehicle network.

3. The operation method according to claim 1, wherein the step of configuring further comprises:
    identifying the path between the first communication node and the second communication node based on a MAC address of the second communication node in the address table;
    identifying a first port corresponding to the MAC address of the second communication node among the plurality of ports included in the first communication node; and
    configuring the first port as the port for wake-up of the second communication node.

4. The operation method according to claim 3, wherein the step of configuring further comprises setting a per-port wake-up indication value for the first port in order to indicate that the second communication node is a wake-up target.

5. The operation method according to claim 1, wherein the step of providing further comprises:
    obtaining software for updating the software for the second communication node from a memory of the first communication node; and
    transmitting a third message including the obtained software to the second communication node via the configured port.

6. The operation method according to claim 1, further comprising releasing the configured port from the port for wake-up of the second communication node when a fourth message indicating that the software for the second communication node has been updated is received via the configured port.

7. An operation method of a first communication node among a plurality of communication nodes included in an Ethernet-based vehicle network, comprising steps of:
    receiving a first message requesting a diagnosis for a second communication node among the plurality of communication nodes;
    configuring a port for wake-up of the second communication node based on a path between the first communication node and the second communication node;
    transmitting a second message instructing wake-up of the second communication node via the configured port; and
    performing the diagnosis for the second communication node based on the path corresponding to the configured port,
    wherein the port is configured based on an address table including:
    port numbers of a plurality of ports included in the first communication node;
    medium access control (MAC) addresses of a plurality of communication nodes connected directly or indirectly to each of the plurality of ports;
    virtual local area network (VLAN) identifiers of the plurality of communication nodes connected to each of the plurality of ports; and
    per-port wake-up indication values each of which indicates whether to wake up each of the plurality of communication nodes which are respectively connected through the plurality of ports.

8. The operation method according to claim 7, wherein the first message is received from an on-board diagnostic (OBD) apparatus capable of diagnosing the plurality of communication nodes included in the Ethernet-based vehicle network.

9. The operation method according to claim 7, wherein the step of configuring further comprises:
    identifying the path between the first communication node and the second communication node based on a MAC address of the second communication node in the address table;

identifying a first port corresponding to the MAC address of the second communication node among the plurality of ports included in the first communication node; and
configuring the first port as the port for wake-up of the second communication node.

10. The operation method according to claim 9, wherein the step of configuring further comprises setting a per-port wake-up indication value for the first port in order to indicate that the second communication node is a wake-up target.

11. The operation method according to claim 7, wherein the step of performing further comprises:
transmitting a third message instructing to perform a diagnostic operation indicated by the first message to the second communication node via the configured port;
receiving a fourth message including information on a result of the diagnostic operation from the second communication node; and
performing the diagnosis for the second communication node based on the result of the diagnostic operation.

12. The operation method according to claim 7, further comprising releasing the configured port from the port for wake-up of the second communication node when a fifth message indicating that the diagnosis for the second communication node has been performed is received via the configured port.

13. A first communication node among a plurality of communication nodes in an Ethernet-based vehicle network, comprising a processor and a memory storing at least one instruction executed by the processor, wherein the at least one instruction is configured to:
receive a first message requesting for a wake-up of a second communication node among the plurality of communication nodes;
configure a port for the wake-up of the second communication node based on an address table including information on a plurality of communication nodes which are respectively connected through a plurality of ports included in the first communication node; and
transmit a second message instructing wake-up of the second communication node via the configured port,
wherein the port is configured based on an address table including:
port numbers of a plurality of ports included in the first communication node;
medium access control (MAC) addresses of a plurality of communication nodes connected directly or indirectly to each of the plurality of ports;
virtual local area network (VLAN) identifiers of the plurality of communication nodes connected to each of the plurality of ports; and
per-port wake-up indication values each of which indicates whether to wake up each of the plurality of communication nodes which are respectively connected through the plurality of ports.

14. The first communication node according to claim 13, wherein the at least one instruction is further configured to:
identify a path between the first communication node and the second communication node based on a MAC address of the second communication node in the address table;
identify a first port corresponding to the MAC address of the second communication node among the plurality of ports included in the first communication node; and
set a per-port wake-up indication value for the first port in order to indicate that the second communication node is a wake-up target.

* * * * *